United States Patent [19]

Quiring et al.

[11] 4,286,080

[45] Aug. 25, 1981

[54] EXTRUSION PROCESS FOR THE PREPARATION OF POLYURETHANE UREAS

[75] Inventors: Bernd Quiring, Leverkusen; Wolfgang Wenzel, Bergisch Gladbach; Georg Niederdellmann; Hans Wagner, both of Dormagen; Wilhelm Goyert, Cologne, all of Fed. Rep. of Germany

[73] Assignee: Bayer Aktiengesellschaft, Leverkusen, Fed. Rep. of Germany

[21] Appl. No.: 161,613

[22] Filed: Jun. 20, 1980

[30] Foreign Application Priority Data

Jun. 27, 1979 [DE] Fed. Rep. of Germany ....... 2925944

[51] Int. Cl.³ .................. C08G 18/08; C08G 18/63
[52] U.S. Cl. ................. 525/455; 264/176 R; 528/44; 528/49; 528/69; 528/75
[58] Field of Search .................. 528/44, 69; 525/455

[56] References Cited

U.S. PATENT DOCUMENTS

| | | | |
|---|---|---|---|
| 3,963,679 | 6/1976 | Ullrich et al. | 528/45 |
| 4,049,632 | 9/1977 | Magnusson et al. | 528/59 |
| 4,051,212 | 9/1977 | Grigat et al. | 260/2.3 |
| 4,055,549 | 10/1977 | Roberts | 528/80 |

FOREIGN PATENT DOCUMENTS

2302564 7/1974 Fed. Rep. of Germany .
2423764 11/1975 Fed. Rep. of Germany .

OTHER PUBLICATIONS

Condensed Chemical Dictionary, 9th Edition, Van Nostrand, N-4, (1977) p. 924.

*Primary Examiner*—H. S. Cockeram
*Attorney, Agent, or Firm*—Gene Harsh; Joseph C. Gil; Lyndanne M. Whalen

[57] ABSTRACT

The present invention relates to a process for the preparation of polyurethane ureas from relatively high molecular weight polyols, diisocyanates, water as chain lengthening agent and optionally short chain glycols in a multishaft extruder equipped with kneading elements.

10 Claims, No Drawings

EXTRUSION PROCESS FOR THE PREPARATION OF POLYURETHANE UREAS

FIELD OF THE INVENTION

The present invention relates to a process for the preparation of polyurethane ureas from relatively high molecular weight polyols, diisocyanates, water as chain lengthening agent and optionally short chain glycols in a multishaft extruder equipped with kneading elements.

BACKGROUND OF THE INVENTION

The preparation of polyurethane ureas from an isocyanate prepolymer and water at temperatures from 70° to 100° C. in a mixer operating at a low mixing intensity has been described in U.S. Pat. No. 4,049,632. This process, however, has only limited applicability because the prepolymers must be synthesized from difunctional polyesters with equivalent weights of from 480 to 540 and selected diisocyanates. In order to keep these prepolymers workable, i.e. stirrable, the NCO/OH ratio must not fall below a certain limit. On the other hand, if a certain NCO/OH ratio is exceeded in preparing the isocyanate prepolymer, the products obtained from the subsequent reaction with water are not homogeneous. The use of multishaft screw extruders is not mentioned.

Thermoplastic polyurethanes and their preparation from tolylene diisocyanate, polycaprolactone diol, a low molecular weight glycol and water has been described in U.S. Pat. No. 4,055,549. According to this patent specification, the products of the process are preferably produced discontinuously. When a continuous extruder process is employed, the reaction between tolylene diisocyanate and water is carried out before the components are introduced into the extruder to prevent evolution of carbon dioxide and foaming and the attendant buildup of pressure in the extruder. U.S. Pat. No. 4,055,549 teaches that the reaction between the isocyanate component and water is started at temperatures below 100° C. Experience has shown that this low starting temperature does not result in a desirable distribution of polyurea hard segments and polyurethane soft segments in the resulting macro molecule.

The preparation of polyurethane or polyureas from polyisocyanates and polyols in the absence of water in multishaft screw extruders with kneading elements has been described in U.S. Pat. No. 3,963,679. However, there is no indication of how to produce these polyurethanes as polyureas in multishaft screw extruders with water without the problem of carbon dioxide evolution and the attendant pressure buildup.

It has now surprisingly been found that, contrary to the teaching of U.S. Pat. No. 4,055,549, it is possible to prepare polyurethane polyureas by the reaction of polyisocyanates with water in extruders, preferably multishaft screw extruders, without the polyurethane leaving the extruder having frothed.

DESCRIPTION OF THE INVENTION

The present invention relates to a process for the continuous preparation of polyurethane ureas by reacting, which may be stepwise, of (A) one or more polyisocyanates;

(B) one or more compounds having an average of at least 1.8 Zerewitinoff-active hydrogen atoms and a molecular weight from 400 to 10,000, preferably from 450 to 6,000 and/or (A') an isocyanate group-containing prepolymer of components (A) and (B) with (C) 0.07 to 40% by weight, preferably 0.1 to 35% by weight, most preferably 0.2 to 30% by weight, based on the sum of Zerewitinoff-active compounds (B)+(C)+(D), of water and optionally (D) other compounds with a molecular weight from 32 to 400, preferably 62 to 350 having one or more Zerewitinoff-active hydrogen atoms; and optionally (E) monoisocyanates;

wherein the equivalent ratio of component (B) to the sum of components (C) and (D) is within the range of 5:1 to 1:30, the molar proportion of component (C) amounts to at least 5% of the sum of (C) and (D) and the equivalent ratio of isocyanate groups to Zerewitinoff-active hydrogen atoms, including water, is below 1.1:1, preferably below 1.05:1 and most preferably below 1:1, in screw extruders. The screw extruders are further characterized as being multishaft screw extruders with self-cleaning screws equipped with kneading elements, preferably an extruder having two shafts rotating in the same direction, the reaction mixture preferably passing through the reaction phase in which its viscosity is from 10 to 100 Pa.s in a zone of the screw which contains intensively mixing kneading elements operating at a kneading frequency of 1 to 20 Hertz and at a velocity gradient in the radial clearance between screw and wall of housing of more than 2,000 sec$^{-1}$.

Component (C) is fed into the screw extruder at a point where the reaction mixture is at a temperature of 120° to 280° C., preferably 170° to 270° C. The pressure and temperature are so adjusted relative to each other in the intake zone and reaction zone of the screw extruder that component (C) is in the gaseous phase. Additionally, the temperature in the extrusion zone is adjusted so that the extrudate is subjected to a pressure of at least 10 bar, preferably from 10 to 30 bar.

In the instant process, the reaction can be carried out to produce a homogeneous mass which, contrary to the teaching of U.S. Pat. No. 4,055,549, leaves the extruder as a molten mass which is free from bubbles. In addition, there are no signs of excessive buildup of pressure inside the extruder.

The starting materials (A) used for carrying out the instant process may be aliphatic, cycloaliphatic, araliphatic, aromatic or heterocyclic polyisocyanates such as those described e.g. by W. Siefken in Justus Liebigs Annalen der Chemie, 562, pages 75 to 136; for example, those corresponding to the formula:

$$Q(NCO)_n$$

wherein n=2-4, preferably 2, and

Q represents an aliphatic hydrocarbon group having 2 to 18, preferably 6 to 10 carbon atoms, a cycloaliphatic hydrocarbon group having 4 to 15, preferably 5 to 10 carbon atoms, an aromatic hydrocarbon group having 6 to 15, preferably 6 to 13 carbon atoms, or an araliphatic hydrocarbon group having 8 to 15, preferably 8 to 13 carbon atoms.

Examples of these compounds are 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and any mixtures of these isomers. Additional examples are 1-isocyanato-3,3,5-trimethyl-5-isocyanatomethylcyclohexane (German Auslegeschrift 1,202,785; U.S. Pat.

No. 3,401,190); 2,4- and 2,6-hexahydrotolylene diisocyanate and any mixtures of these isomers. Further examples are hexahydro-1,3- and/or -1,4-phenylene diisocyanate; perhydro-2,4'- and/or -4,4'-diphenylmethane diisocyanate; 1,3- and 1,4-phenylene diisocyanate; 2,4-and 2,6-tolylene diisocyanate and any mixtures of these isomers. Still further examples of suitable compounds are diphenylmethane-2,4'- and/or -4,4'-diisocyanate; naphthylene-1,5-diisocyanate; 2,4- and 2,6-tolylene diisocyanate substituted on the aromatic nucleus by one or more alkyl groups having 1 to 3 carbon atoms and 4,4'- and 2,4'-diisocyanato-diphenylmethane substituted on the aromatic nuclei by one or more alkyl groups having 1 to 3 carbon atoms.

Aromatic diisocyanates are preferred, particularly tolylene and diphenylmethane diisocyanates which may be substituted with alkyl groups.

Higher functional isocyanates such as triphenylmethane triisocyanate and distillation residues from the recovery of diphenylmethane diisocyanate may also be used. However, if the end products are to be processed thermoplastically or from solution, the average functionality must not substantially exceed 2 and the use of any components having a higher functionality must be compensated by the use of other components having a functionality lower than 2.

Starting components (B) suitable for use in the instant invention include compounds having an average of at least 1.8 isocyanate reactive hydrogen atoms and generally a molecular weight in the range of 400 to 10,000. These components may include compounds containing amino groups, thiol groups or carboxyl groups but are preferably hydroxyl compounds. Particularly preferred are compounds having 2 to 8 hydroxyl groups, especially those with molecular weights from 450 to 6,000, preferably 600 to 4,500. Examples of these compounds are polyesters, polyethers, polythioethers, polyacetals, polycarbonates and polyester amides having at least 2, generally 2 to 8 and preferably 2 to 4, hydroxyl groups such as the compounds already known for the production of both homogeneous and cellular polyurethanes.

The hydroxyl polyesters which may be used in the instant invention include e.g. reaction products of polyhydric, preferably dihydric alcohols, to which trihydric alcohols may be added and polybasic, preferably dibasic, carboxylic acids. Instead of free polycarboxylic acids, the corresponding polycarboxylic acid anhydrides or polycarboxylic acid esters of lower alcohols or mixtures thereof may be used for the preparation of the polyesters. The polycarboxylic acids may be aliphatic, cycloaliphatic, aromatic and/or heterocyclic and they may be substituted, e.g. by halogen atoms, and/or unsaturated.

The following are mentioned as examples of such carboxylic acids and their derivatives: succinic acid; adipic acid; suberic acid; azelaic acid, sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimerized and trimerized unsaturated fatty acids which may be mixed monomeric unsaturated fatty acids such as oleic acid; dimethyl terephthalate and terephthalic acid-bis-glycol esters.

Suitable polyhydric alcohols are, for example, ethylene glycol; propylene glycol-(1,2) and -(1,3); butylene glycol-(1,4) and -(2,3); hexanediol-(1,6); octanediol-(1,8); neopentylglycol; 1,4-bis-hydroxymethylcyclohexane; 2-methyl-1,3-propanediol; glycerol; trimethylol propane; hexanetriol-(1,2,6); butanetriol-(1,2,4); trimethylol ethane and pentaerythritol. Additional examples are quinitol; mannitol; sorbitol; formitol; methylglycoside; diethylene glycol; triethylene glycol; tetraethylene glycol and higher polyethylene glycols. Dipropylene glycol and higher polyproplene glycols and dibutylene glycol and higher polybutylene glycols are still further examples. The polyesters may also contain a proportion of carboxyl end groups. Polyester of lactones such as $\epsilon$-caprolactone or of hydroxycarboxylic acids such as $\omega$-hydroxycaproic acid may also be used.

The polyethers used in the instant invention have at least 2, generally 2 to 8 and preferably 2 to 3, hydroxyl groups and are also known per se. They may be prepared, for example, by the polymerization of epoxides, either each on its own, e.g. in the presence of Lewis catalysts such as borontrifluoride, or by the addition of these epoxides, either as mixtures or successively, to starting components having reactive hydrogen atoms. Examples of the epoxides suitable for the above production of polyethers are ethylene oxide; propylene oxide; butylene oxide; tetrahydrofuran; styrene oxide and epichlorohydrin. Ethylene oxide and propylene oxide are particularly preferred. Examples of components having reactive hydrogen atoms are water; alcohols; ammonia or amines, e.g. ethylene glycol; propylene glycol-(1,3) or -(1,2); trimethylol propane; glycerol; sorbitol; 4,4'-dihydroxy diphenyl propane; aniline; ethanolamine or ethylene diamine. Sucrose polyethers may also be used in the instant invention, e.g. those described in German Auslegeschriften 1,176,358 and 1,064,938 as well as polyethers started on formitol or formose (German Offenlegungsschriften 2,639,083 and 2,737,951). In many cases, it is preferred to use polyethers which contain predominantly primary hydroxyl groups (up to 90% by weight, based on all the hydroxyl groups present in the polyether). Polybutadienes which have hydroxyl groups are also suitable for use in the instant invention.

Suitable polyethers are also the polythioethers. Polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the co-components.

Suitable polyacetals include the compounds which can be prepared from glycols. For example, diethylene glycol; triethylene glycol; 4,4'-dioxethoxy-diphenyldimethylmethane; hexanediol and formaldehyde are suitable polyacetals. Suitable polyacetals for the instant invention may also be prepared by the polymerization of cyclic acetals, e.g. trioxane (German Offenlegungsschrift 1,694,128).

Suitable polycarbonates with hydroxyl groups may be of known kind, for example those which can be prepared by the reaction of diols such as propanediol-(1,3); butanediol-(1,4) and/or hexanediol-(1,6); diethylene glycol; triethylene glycol; tetraethylene glycol or thiodiglycol with diarylcarbonates, e.g. with diphenylcarbonate or phosgene (German Auslegeschriften 1,694,080; 1,915,908 and 2,221,751; German Offenlegungsschrift 2,605,024).

Suitable polyester amides and polyamides include, for example, the predominantly linear condensates prepared from polyvalent saturated or unsaturated carboxylic acids or their anhydrides and polyvalent saturated or unsaturated amino alcohols, diamines, polyamines and mixtures thereof.

Polyhydroxyl compounds already containing urethane or urea groups and modified or unmodified natural polyols such as castor oil or carbohydrates, e.g. starch, may also be used. Addition products of alkylene oxides and phenol formaldehyde resins or of alkylene oxides and urea formaldehyde resins are also suitable for use in the instant invention.

The above-mentioned polyhydroxyl compounds may be modified in various ways before they are used in the polyisocyanate polyaddition process. According to German Offenlegungsschriften 2,210,839 (U.S. Pat. No. 3,849,515) and 2,544,195, for example, a mixture of various polyhydroxyl compounds (e.g. a polyether polyol and a polyester polyol) may be condensed by etherification in the presence of a strong acid to form a relatively high molecular weight polyol built up of various segments linked through ether bridges. Furthermore, according to German Offenlegungsschrift 2,559,372, for example, amide groups may be introduced into the polyhydroxyl compounds or, according to German Offenlegungsschrift 2,620,487, triazine groups may be introduced by a reaction with polyfunctional cyanic acid esters. Polyhydroxyl compounds containing guanidine, phosphonoformamidine or acyl urea groups may be obtained by the reaction of a polyol with a less than equivalent quantity of a diisocyanatocarbodiimide followed by a reaction of the carbodiimide group with an amine, amide, phosphite or carboxylic acid (German Offenlegungsschriften 2,714,289; 2,714,292 and 2,714,293). In some cases, it is of particular interest to convert the relatively high molecular weight polyhydroxyl compounds either partly or completely into the corresponding anthranilic acid esters by a reaction with isatoic acid anhydride as described in German Offenlegungsschriften 2,019,432 and 2,619,840 or U.S. Pat. Nos. 3,808,250; 3,975,428 and 4,016,143. Relatively high molecular weight compounds having aromatic amino end groups are obtained in this manner.

According to German Offenlegungsschrift 2,546,536 and U.S. Pat. No. 3,865,791, relatively high molecular weight compounds containing amino end groups are obtained by reacting isocyanate prepolymers with hydroxyl-containing enamines, aldimines or ketimines followed by hydrolysis. Other methods of preparation for relatively high molecular weight compounds containing amino end groups or hydrazide end groups are described in German Offenlegungsschrift 1,694,152 (U.S. Pat. No. 3,625,871).

Polyhydroxyl compounds in which high molecular weight polyadducts or polycondensates of polymers are contained in a finely dispersed or dissolved form may also be used in the instant invention. Such polyhydroxyl compounds may be obtained, for example, by carrying out polyaddition reactions, e.g. reactions between polyisocyanates and amino functional compounds or polycondensation reactions, e.g. between formaldehyde and phenol and/or amines, in situ in the above-mentioned hydroxyl compounds. Processes of this type have been described, for example, in German Auslegeschriften 1,168,075 and 1,260,142 and in German Offenlegungsschriften 2,324,134; 2,423,984; 2,512,385; 2,513,815; 2,550,796; 2,550,797; 2,550,833; 2,550,862; 2,633,293 and 2,639,254. According to U.S. Pat. No. 3,869,413 and German Offenlegungsschrift 2,550,860, such compounds may also be obtained by mixing a previously prepared aqueous polymer dispersion with polyhydroxyl compound and then removing the water from the mixture.

Polyhydroxyl compounds modified by vinyl polymers, e.g. the substances obtained by the polymerization of styrene and acrylonitrile in the presence of polyethers (U.S. Pat. Nos. 3,383,351; 3,304,273; 3,523,093 and 3,110,695; German Auslegeschrift 1,152,536) or polycarbonate polyols (German Pat. No. 3,637,909) are also suitable for the instant process. When using polyether polyols which have been modified according to German Offenlegungsschriften 2,442,102; 2,644,922 and 2,646,141 by graft polymerization with vinyl phosphonic acid esters and optionally (meth)acrylonitrile, (meth)acrylamide or OH-functional (meth)acrylic acid esters, the polymer products obtained are exceptionally flame resistant. Polyhydroxyl compounds into which carboxyl groups have been introduced by radical graft polymerization with unsaturated carboxylic acids and optionally other olefinically unsaturated monomers (German Offenlegungsschriften 2,714,291; 2,739,620 and 2,654,746) are particularly advantageous to use in combination with mineral fillers.

When modified polyhydroxyl compounds of the type mentioned above are used as starting components for the polyisocyanate polyaddition process, the polyurethane products obtained have, in many cases, substantially improved mechanical properties.

Representatives of compounds which may be used in the instant invention have been described, for example, in High Polymers, Volume XVI, "Polyurethanes Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff Handbuch, Volume VII, Vieweg-Hochtlen, Carl-Hanser-Verlag, Munich, 1966, e.g. on pages 45 to 71.

Mixtures of the above-mentioned compounds which contain at least 1.8 isocyanate-reactive hydrogen atoms and have a molecular weight in the range of 400 to 10,000 may, of course, also be used. For example, mixtures of polyethers and polyesters may be used in the instant invention.

In some cases, it is particularly advantageous to use combinations of low melting and high melting polyhydroxyl compounds (German Offenlegungsschrift (2,706,297).

Examples of optional starting components (D) used in the instant invention include compounds with a molecular weight from 32 to 400 containing at least 2 isocyanate-reactive hydrogen atoms. There are also compounds containing hydroxyl groups and/or amino groups and/or thio groups and/or carboxyl groups, preferably hydroxyl groups and/or amino groups, and they serve as chain lengthening agents or cross-linking agents. They generally have 2 to 8, preferably 2 to 4 isocyanate-reactive hydrogen atoms.

Here again, there may be used mixtures of various compounds containing at least 2 isocyanate-active hydrogen atoms and having molecular weights from 32 to 400.

The following are examples of such compounds: ethylene glycol; propylene glycol-(1,2) and -(1,3); butylene glycol-(1,4) and -(2,3); pentanediol-(1,5); hexanediol-(1,6); octanediol-(1,8); neopentyl glycol; 1,4-bis-hydroxymethyl-cyclohexane; 2-methyl-1,3-propanediol; dibromobutenediol (U.S. Pat. No. 3,723,392); glycerol; trimethylol propane; hexanetriol-(1,2,6); trimethylolethane; pentaerythritol; quinitol; mannitol and sorbitol; castor oil; diethylene glycol; triethylene glycol; tetraethylene glycol; higher polyethylene glycols with a molecular weight of up to 400; dipropylene glycol; higher polypropylene glycols with a molecular weight of up to 400; dibutylene glycol; higher polybutylene glycols with a molecular weight of up to 400; 4,4'-dihydroxy diphenyl propane; hydroquinonedihydroxyethylether; ethanolamine; diethanolamine; N-methyl diethanolamine; triethanolamine and 3-aminopropanol.

The low molecular weight polyols used in the instant invention may also be mixtures of hydroxyaldehydes and hydroxyketones ("formose") or the polyhydric alcohols obtained from them by reduction ("formitol") which may be prepared by the autocondensation of formaldehyde hydrate in the presence of metal compounds as catalysts and compounds capable of enediol formation as co-catalysts (German Offenlegungsschriften 2,639,084; 2,714,084; 2,714,104; 2,721,186; 2,738,154 and 2,738,512). These formoses are advantageously used in combination with aminoplast formers and/or phosphites in order to obtain polymer products with improved flame resistance (German Offenlegungsschriften 2,738,513 and 2,738,532). Solutions of polyisocyanate polyaddition products, in particular of polyhydrazodicarbonamides and/or polyurethane ureas containing ionic groups in low molecular weight polyhydric alcohols may also be used in polyol components according to the invention (German Offenlegungsschrift 2,638,759).

Aliphatic diamines suitable for the purpose of the invention include, for example, ethylene diamine; 1,4-tetramethylene diamine; 1,11-undecamethylene diamine; 1,12-dodecamethylene diamine and mixtures thereof. 1-amino-3,3,5-trimethyl-5-aminomethylcyclohexane ("isophorone diamine"); 2,4- and 2,6-hexahydrotolylene diamine and their mixtures are also suitable examples of aliphatic diamines. Perhydro-2,4'- and 4,4'-diamino-diphenylmethane; p-xylylene diamine; bis-(3-aminopropyl)-methylamine; diamino-perhydroanthracenes (German Offenlegungsschrift 2,638,731) and cycloaliphatic triamines according to German Offenlegungsschrift 2,614,244 are further examples of suitable diamines. Hydrazine and substituted hydrazines, e.g. methylhydrazine, N,N'-dimethylhydrazine and their homologues may also be used for the instant invention. Acid dihydrazides, e.g. carbodihydrazide; oxalic acid dihydrazide; the dihydrazides of malonic acid; succinic acid; glutaric acid; adipic acid; β-methyladipic acid; sebacic acid; hydracrylic acid and terephthalic acid may be used as well. Semicarbazido-alkylene hydrazides such as β-semicarbazidopropionic acid hydrazide (German Offenlegungsschrift 1,770,591); semicarbazido-alkylene carbazic esters such as 2-semicarbazido-ethyl carbazic ester (German Offenlegungsschrift 1,918,504) or also amino semicarbazide compounds, e.g. β-aminoethylsemicarbazido carbonate (German Offenlegungsschrift 1,902,931) are still further examples of suitable components. To control their reactivity, the amino groups may be partly or completely blocked by aldimine or ketimine groups (U.S. Pat. No. 3,734,894; German Offenlegungsschrift 2,637,115).

Examples of aromatic diamines include bisanthranilic acid esters according to German Offenlegungsschriften 2,040,644 and 2,160,590; 3,5- and 2,4-diaminobenzoic acid esters according to German Offenlegungsschrift 2,025,900. The diamines with ester groups described in German Offenlegungsschriften 1,803,635 (U.S. Pat. Nos. 3,681,290 and 3,736,350); 2,040,650 and 2,160,589, as well as the diamines with ether groups according to German Offenlegungsschriften 1,770,525 and 1,809,172 (U.S. Pat. Nos. 3,654,364 and 3,736,295) are also suitable. 2-halogen-1,3-phenylene diamines which may be substituted in the 5-position (German Offenlegungsschriften 2,001,772; 2,025,896 and 2,065,869); 3,3'-dichloro-4,4'-diamino-diphenylmethane; tolylene diamine; 4,4'-diamino-diphenylmethane; 4,4'-diamino-diphenyldisulfides (German Offenlegungsschrift 2,404,976); diamino-diphenyldithio ethers (German Offenlegungsschrift 2,509,404); aromatic diamines substituted with alkyl thio groups (German Offenlegungsschrift 2,638,760); diamino-benzene-phosphonic acid esters (German Offenlegungsschrift 2,459,491); aromatic diamines containing sulfonate or carboxylate groups (German Offenlegungsschrift 2,720,166) as well as the high melting diamines mentioned in German Offenlegungsschrift 2,635,400 are also suitable. Examples of aliphatic-aromatic diamines include the aminoalkylthio anilines according to German Offenlegungsschrift 2,734,574.

The chain lengthening agents used in the instant invention may also be compounds such as 1-mercapto-3-aminopropane; substituted or unsubstituted amino acids such as glycine, alanine, valine, serine and lysine; and substituted or unsubstituted dicarboxylic acids such as succinic acid, adipic acid, phthalic acid, 4-hydroxyphthalic acid and 4-aminophthalic acid.

Compounds which are monofunctional in their reaction with isocyanates may also be added in proportions of 0.01 to 10% by weight, based on the polyurethane solids content, to serve as so-called chain breakers. Examples of such monofunctional compounds include monoamines such as butylamine and dibutylamine, octylamine, stearylamine, N-methylstearylamine, pyrrolidine, piperidine and cyclohexylamine; monohydric alcohols such as butanol, 2-ethylhexanol, octanol, dodecanol, the various amyl alcohols, cyclohexanol and ethylene glycol monoethyl ether.

Low molecular weight polyols with molecular weights of up to 400 which are suitable for the instant invention also include ester diols corresponding to the following formulae:

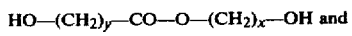

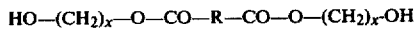

wherein
R represents an alkylene group having 1 to 10, preferably 2 to 6 carbon atoms or a cycloalkylene or arylene group having 6 to 10 carbon atoms,
x=2 to 6, and
y=3 to 5.

Examples of compounds corresponding to the above formulae are, for example, δ-hydroxybutyl-ε-hydroxycaproic acid ester; ω-hydroxyhexyl-γ-hydroxybutyric acid ester, adipic acid-bis-(β-hydroxyethyl) ester and terephthalic acid-bis-(β-hydroxyethyl) ester.

The low molecular weight polyols suitable for the instant invention also include diol urethanes corresponding to the formula:

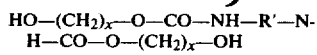

wherein
R' represents an alkylene group having 2 to 15, preferably 2 to 6 carbon atoms or a cycloalkylene or arylene group having 6 to 15 carbon atoms, and
x represents a number from 2 to 6.

Examples of this type of compound are 1,6-hexamethylenebis-(β-hydroxyethylurethane) or 4,4'-diphenylmethanebis-(δ-hydroxybutylurethane).

Diolureas corresponding to the formula:

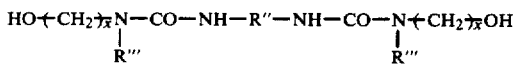

wherein
R" represents an alkylene group having 2 to 15, preferably 2 to 9 carbon atoms or a cycloalkylene or arylene group having 6 to 15 carbon atoms,
R'" represents hydrogen or a methyl group, and
X represents 2 to 3,
are also suitable low molecular weight polyols for the instant invention. Specific examples are 4,4'-diphenylmethane-bis-(β-hydroxyethylurea) and compounds of the formula:

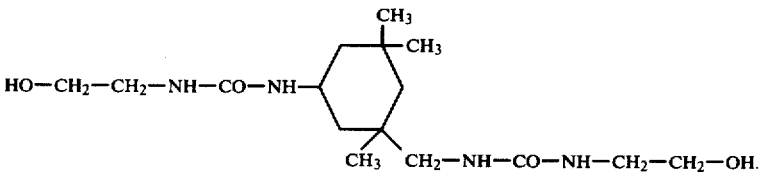

For some purposes, it is advantageous to use polyols which contain sulfonate and/or phosphonate groups (German Offenlegungsschrift 2,719,372), preferably the adduct of bisulfite and butenediol-(1,4) or its alkoxylation products.

When choosing components (B) and (D), care should be taken to ensure, as in the case of the polyisocyanate component (A), that the average functionality of the reactants does not substantially exceed two if the end products are to be processed thermoplastically. Compounds with a higher functionality should therefore be compensated for by inclusion of the above-mentioned monofunctional starting components.

Examples of suitable monoisocyanates (E) include stearyl isocyanate, cyclohexyl isocyanate, chlorohexyl isocyanate and phenyl isocyanate.

Among the chain lengthening agents (D) suitable for the instant invention, the following are preferred: ethylene glycol, diethylene glycol, butanediol-(1,4), hexanediol-(1,6), octanediol-(1,8), dimethylolcyclohexane and hydroquinone-dihydroxy ethyl ether. Butanediol and hexanediol-(1,6) are particularly preferred.

Water, component (C), may be introduced into the reaction in the form of water of crystallization or in an adsorptively bound form.

The instant process may be carried out in the known multishaft screw extruders with self-cleaning screws, particularly, double shaft extruders having both screws rotating in the same direction such as those described e.g. in German Offenlegungsschriften 2,302,564 and 2,423,764 (U.S. Pat. No. 3,963,679) and the literature cited therein. The screw extruders suitable for the instant invention are equipped with known kneading elements which have also been described in detail, e.g. in German Offenlegungsschriften 2,302,564 and 2,423,764.

The extruders used are preferably composed of several housing parts which can be heated and cooled separately and subdivided into intake zones (introduction of reactants), reaction zones and extrusion zones. The kneading elements are preferably provided at least in those parts of the reaction zones in which the reaction mixture passes through the "critical" tacky phase described in German Offenlegungsschriften 2,302,564 and 2,423,764 in which it has a viscosity of ca. 10 to 100 Pa.s. This results in particularly homogeneous end products.

In the instant process, the components (A) to (E) may all be introduced into the extruder at the same poin preferably in the first housing, either separately or already partly mixed, or they may be introduced continuously at different points. Thus, for example, components (A) and (B) may be introduced at the beginning of the screw extruder and the chain lengthening agents (D) and water at the middle of the extruder. According to a particularly preferred variation of the process, components (A) and (B) and optionally also (D) and (E) are introduced at the beginning of the extruder and water at a later point.

In one special embodiment of the instant process, the initial phase of the reaction is carried out in a multishaft extruder and the reaction may then be continued (after termination of the "critical" phase) in a single shaft extruder behind the first extruder.

The polyisocyanate polyaddition reaction is carried out at temperatures in the range of 80° to 300° C., preferably 100° to 290° C.

An essential feature of the invention is that the temperature of the reaction mixture should be above the boiling point of water, at the prevailing pressure in the extruder, both in the intake zone in which the water is introduced and in the reaction zone in which the water reacts with the polyisocyanate to effect chain lengthening, so that the water is in the vapor phase. This is achieved by regulating the heating and cooling means in the appropriate zones of the housing so that the temperature is in the region of 120° to 280° C., preferably 170° to 270° C.

The end of the screw is cooled so that a pressure of at least 10 bar, preferably 10 to 30 bar, builds up in the extrudate at the nozzle. This prevents steam from escaping with the extrudate.

In a preferred embodiment of the instant process, the extruder is equipped with one or more, preferably one or two, commercial exhaust housings through which gases such as carbon dioxide and water vapor can escape or be removed by suction. The housings used for degasing may be installed either before and/or behind the point of introduction of water viewed in the direction of transport. Degasing may also be carried out under excess pressure to prevent foaming.

The housings for degasing should not be arranged too close to the intake zones nor should they be in the direct vicinity of the extrusion zone because this would allow the extrudate which is under pressure to enter the degasing housing.

The quantity of water to be used in the instant invention is preferably at least 100% of the theoretical amount. It may, however, in some cases, be advisable to use 800% or even more than 5,000% of the theoretically required quantity, calculated from the excess of isocyanate groups over Zerewitinoff-active hydrogen atoms of components (B) and (D).

The polyisocyanate polyaddition reaction may also be accelerated with the usual catalysts used in polyurethane chemistry. Examples of such catalysts include tertiary amines, other bases such as tetraalkylammonium hydroxides, sodium hydroxide, sodium phenolate, etc. and organic metal compounds. Suitable catalysts for the instant invention have been described, e.g. in Kunststoff Handbuch, Volume VII, by Vieweg-Hochtlen, publishers Carl-Hanser-Verlag, Munich, 1966, e.g. on pages 96 to 102.

The reaction may also be carried out in the presence of lubricants, dyes, pigments and other additives such as fillers and reinforcing agents (e.g. also other thermoplasts and fibers). It is also possible, although not necessary, to carry out the reaction in the presence of solvents which are inert towards isocyanate groups, e.g. esters, ethers, hydrocarbons, ketones, halogenated hydrocarbons or peralkylated acid amides.

The instant process makes it possible for the continuous production of polyurethanes to be substantially simplified. In the continuous production of soluble and/or thermoplastic polyurethanes carried out at present, it is absolutely essential to avoid fluctuations in the rate of supply of the feed pumps by 1% or more because otherwise the end products will differ widely in their molecular weights. If, on the other hand, the instant process is carried out with an equivalent ratio of polyisocyanate (A) to the sum of (B) and optionally (D) slightly greater than 1 and water is used in excess, the equivalent ratio of reacted isocyanate groups to Zerewitinoff-active groups in the reaction product will always be 1:1, even in the event of wide fluctuation in the delivery rates of the various feed pumps, so that the end product will have a virtually constant molecular weight. The fluctuations in the feed rate will then only alter the proportions of urea groups and urethane groups which, within certain limits, will have virtually no effect on the properties of the products.

It is surprising that at the temperatures employed in the instant process which are in part far above 100° C., the free isocyanate groups react virtually quantitatively with water in the screw extruder to undergo chain lengthening in spite of the fact that these temperatures are sufficient to hydrolyze polyurethanes virtually quantitatively under similar conditions (see German Offenlegungsschrift 2,442,387, U.S. Pat. No. 4,051,212). It is surprisingly found that in the instant process virtually no splitting of urethane or ester groups occurs even in the presence of excess quantities of water.

If the conditions of the instant process are not observed, the end products obtained are less homogeneous, contain gel particles and, for a given formulation, are more turbid and less soluble.

The product melt leaving the extruder is cooled and size-reduced in known manner.

The products of the instant process may be worked up from solution or thermoplastically. Plates, foils, etc. for example, may also be shaped by a suitable nozzle at the exit from the extruder.

The products of the instant process have high quality mechanical properties, particularly their strength properties. They are used for elastic coatings, e.g. for textiles, as foils, for machine parts, gear wheels, sleeves, cable sheaths, hoses, seals, bearing shells or car body parts and parts of shoes. These applications of the end products are known.

The following Examples serve to illustrate the process of the invention without restricting it in any way. In the Examples, all quantities quoted represent parts by weight or percent by weight, unless otherwise indicated.

The apparatus used in the Examples was a two-shaft, self-cleaning screw extruder with both screws rotating in the same direction, Model ZSK 53 of Werner & Pfleiderer, having the following dimensions: shaft diameter D=53 mm; length of shaft=41 D (2,173 mm); length of kneading zones=90 to 300 mm; radial clearance=ca. 0.1 mm.

The housing of the extruder had twelve zones of equal length, which can be heated or cooled nearly independently. The first intake zone was situated in the first housing zone, the second intake zone at the end of the fifth housing. The kneading elements were substantially triangular in cross-section and situated in the fourth, seventh, eighth and tenth housing. In example 16 the seventh housing was designed as a degasing housing. The temperatures used in the Examples are shown in the following Table I.

TABLE I

| Housing | \multicolumn{12}{c}{Housing Temperature in °C.} | Nozzle plate |
|---|---|---|---|---|---|---|---|---|---|---|---|---|---|
|  | 1 | 2 | 3 | 4 | 5 | 6 | 7 | 8 | 9 | 10 | 11 | 12 |  |
| Example |  |  |  |  |  |  |  |  |  |  |  |  |  |
| 1 |  | 190 |  | 240 | 230 | 210 |  | 170 | 140 | 140 | 120 |  | 185–225 |
| 2 |  | 200 |  | 240 |  | 260 |  | 210 |  | 150 |  | 140 | 180 |
| 3 |  | 200 |  | 235 | 235 | 215 |  | 170 | 140 | 140 | 120 | 75 | 225 |
| 4 |  | 190 |  | 245 | 240 | 230 |  | 180 | 195 | 195 | 165 | 140 | 210 |
| 5,6 |  | 160 |  | 200 | 145 | 145 | 200 | 175 |  | 150 | 130 | 165 | 225 |
| 7,8 |  | 200 |  | 240 | 250 | 240 |  | 200 | 165 | 165 | 80 | 75 | 225 |
| 9 |  | 200 |  | 240 |  | 240 |  | 200 | 155 | 160 | 140 | 90 | 200–225 |
| 10,11 |  | 150 |  | 210 | 230 | 215 |  | 200 | 150 | 140 | 90 | 70 | 200 |
| 12 |  | 240 |  | 220 |  | 240 |  | 220 |  | 165 | 100 | 65 | 210 |
| 13 |  | 80 |  | 220 | 230 | 215 |  | 190 | 155 | 140 | 90 | 70 | 225 |
| 14 |  | 100 |  | 240 | 225 | 225 |  | 180 |  | 140 |  | 80 | 210 |
| 15 |  | 80 |  | 120 | 200 | 240 |  | 220 |  | 180 | 100 | 60 | 200 |
| 16 | 100 | 200 | 200 | 200 | 200 | 220 | 220 | 190 | 190 | 170 | 170 | 170 | 230 |

In Examples 1, 2, 3, 7, 8, 9, 10 and 12, up to five separate products (a, b, c, d, e) were produced in each Example. All of these products were produced using the same procedure. Formulation changes in components 1, 2 and/or 3 are noted by the appropriate product designation (i.e. a, b, c, d or e).

EXAMPLES

EXAMPLE 1

The following are fed continuously into the feed hopper of the first screw housing at the rates indicated per unit time:
1. 200 parts of a mixture heated to 70° C. of 100 parts of a polybutanediol adipate having a hydroxyl number of 52 and an acid number of 0.7, 15 parts of butanediol-(1,4), 1.2 parts of ethylene-bis-stearylamide and 0.4 parts of 2,6-ditertiary-butyl-4-methylphenol;
2. (a) 100 parts of commercial 4,4'-diisocyanatodiphenylmethane,
   (b) 122.5 parts of commercial 4,4'-diisocyanatodiphenylmethane,
   (c) 143.5 parts of commercial 4,4'-diisocyanatodiphenylmethane and
   (d) 164 parts of commercial 4,4'-diisocyanatodiphenylmethane
   maintained at 50° C.

The following are fed continuously into the fifth housing of the extruder:
3. (a) 15 parts of water (equivalent quantity: 0.6 parts),
   (b) 10 parts of water (equivalent quantity: 2.1 parts),
   (c) 6 parts of water (equivalent quantity: 3.7 parts)
   (d) 9 parts of water (equivalent quantity: 5.1 parts).

The speed of rotation of the shafts is varied from 250 to 300 rotations per minute.

The melt viscosity of the products after various dwell times (5, 10, 15 and 20 minutes) is determined in a high pressure capillary viscosimeter HKV 2,000 (manufacturers-Goettfert, Buchen/Odenwald) in a cylinder heated to 210° C. The intrinsic melt index, IMI, is determined by extrapolation to the dwell time 0. The melt index is the quantity in grams flowing through a capillary (L/D=15) at a pressure of 2.45 bar, converted to an outflow time of 10 minutes. The following IMI's were found:

(a) 40 g/10 min.
(b) 170 g/10 min.
(c) 180 g/10 min.
(d) 140 g/10 min.

All the products produce clear, storage stable, highly viscous solutions in a 4:1 mixture of dimethylformamide and methylethyl ketone.

EXAMPLE 2 (Comparison Experiment)

The procedure is the same as in Example 1 but using shafts equipped with threaded elements alone instead of the shafts according to the invention.

The following are fed continuously into the extruder as in Example 1:
(1) 200 parts of the polyol mixture described in Example 1,
(2a) 130.4 parts of diisocyanato-diphenylmethane,
(b) 153 parts of diisocyanato-diphenylmethane, and
(3a) 2.4 parts of water and
(b) 4 parts of water.

The speed of rotation of the shafts is 300 rotations per minute. The product melts leaving the extruder are very cloudy. Solutions of the products in the 4:1 mixture of dimethylformamide and methylethyl ketone become pasty even before the products are completely dissolved.

EXAMPLE 3

The procedure is the same as in Example 1 and the following are introduced continuously into the screw extruder:
(1a) 300 parts of a polyol mixture of 100 parts of the polyadipate described in Example 1, 1.2 parts of ethylene-bis-stearylamide, 0.4 parts of 2,6-ditertiarybutyl-4-methylphenol and 31.5 parts (7.5 mol per mol of polyester) of butanediol-(1,4),
(b) 200 parts of the polyol mixture,
(c) 200 parts of the polyol mixture,
(2a) 307 parts of diisocyanato-diphenylmethane, (b) 204.8 parts of diisocyanato-diphenylmethane,
(c) 163 parts of diisocyanato-diphenylmethane,
(3a) 24 parts of water (theoretical quantity: 5.8 parts),
(b) 27 parts of water (theoretical quantity: 3.9 parts) and
(c) 27 parts of water (theoretical quantity: 0.9 parts).

The shafts are rotated at a speed of 300 min$^{-1}$. The melt leaving the extruder is almost clear. The following IMI values are obtained from melt index measurements:

| Product | Measuring Temperature | IMI |
|---|---|---|
| (a) | 230° C. | 135 g/10 min. |
| (b) | 220° C. | 64 g/10 min. |
| (c) | 220° C. | 89 g/10 min. |

All three products give rise to highly viscous, almost clear solutions when dissolved at concentrations of 25% both in dimethylformamide and in 4:1 mixtures of dimethylformamide and methylethyl ketone.

EXAMPLE 4

The following are fed continuously into the hopper of the screw extruder:
(1) 375 parts of a commercial thermoplastic bisphenol-A polycarbonate(Macrolon ® 3100, Bayer AG),
(2) 200 parts of a mixture of 100 parts of the polyester with hydroxyl number 50 described in Example 1 and 0.4 parts of 2,6-ditertiary-butyl-4-methylphenol and
(3) 136 parts of diisocyanato-diphenylmethane.
(4) 33 parts of a mixture of 15.8 parts of butanediol-(1,4) and 1.35 parts of water are fed continuously into the fifth extruder housing. The shafts are rotated at 250 revolutions per minute. The product has a milky cloudiness and can be processed by injection molding. The tensile strength determined on double shoulder rods S 1 according to DIN 53 504 is 30.5 MPa, the elongation at break is 185%.

EXAMPLE 5

The following are fed at the rates indicated per unit time into the hopper of the screw extruder:
(1) 34 parts of a graft copolymer of polybutadiene (80%), styrene (14%) and acrylonitrile (5,6%),
(2) 200 parts of the polyester described in Example 4 stabilized with ditertiary-butyl-methylphenol, and
(3) 346 parts of diphenylmethane diisocyanate.

Into the second housing are introduced
(4) 88.6 parts of a mixture of 42 parts of butanediol-(1,4) and 3.6 parts of water (molar ratio 7:3).

A milky, cloudy product which can be processed thermoplastically is obtained when a shaft speed of 300 revolutions per minute is employed.

EXAMPLE 6

The procedure is the same as described in Example 5.

The following are reacted continuously in the screw extruder at the rates indicated:
(1) 43 parts of the graft copolymer,
(2) 200 parts of the stabilized polyester,
(3) 265 parts of diphenylmethane diisocyanate,
(4) 78 parts of the mixture of butanediol-(1,4) and water (17% in excess of th theoretical quantity).

The molar ratio of the mixture of chain lengthening agent to the polyester in the reaction product is 10.7:1. The IMI value obtained from a measurement of the melt index at 220° C. under otherwise the same conditions as in Example 1 is 70 g/10 min.

EXAMPLE 7

The following are fed continuously into the feed hopper of the screw extruder at the rate per unit time indicated:
(1) 200 parts of a mixture of 100 parts of the polybutanediol adipate described in Example 1, 0.5 parts of an aromatic carbodiimide (Stabaxol ® 1, Bayer AG), 17.1 parts of butanediol-(1,4) and 1.45 parts of n-octanol and
(2a) 110 parts of diisocyanato-diphenylmethane,
(b) 136 parts of diisocyanato-diphenylmethane and
(c) 160 parts of diisocyanato-diphenylmethane.

The following are fed into the fifth housing of the screw extruder at the rates indicated:
(3a) 27 parts of water (theoretically required quantity: 0.65 parts),
(b) 45 parts of water (theoretically required quantity: 2.5 parts),
(c) 13 parts of water (theoretically required quantity: 4.2 parts).

The products are produced at a speed of rotation of 300 revolutions per minute in the extruder. An almost colorless, almost clear melt which is found to have the following melt indices (IMI) leaves the extruder:

| Product | Measuring Temperature | IMI |
|---|---|---|
| (a) | 200° C. | 95 g/10 min. |
| (b) | 225° C. | 290 g/10 min. |
| (c) | 225° C. | 145 g/10 min. |

The 25% solution of product (a) in dimethylformamide/methylethyl ketone (3:2) has a viscosity of 4,500 mPa.s at 25° C.

EXAMPLE 8

The procedure is the same as in Example 7 but polyol component (1) contains 2.3 parts of n-octanol instead of 1.45 parts thereof. The following substances are fed into the screw extruder at the rates indicated:
(1) 200 parts of the polyol mixture,
(2a) 136 parts of diphenylmethane diisocyanate,
(b) 183 parts of diphenylmethane diisocyanate,
(3a) 13 parts of water (theoretical quantity: 2.4 parts), and
(b) 10 parts of water (theoretical quantity: 5.9 parts).

The almost clear, almost colorless products have the following IMI values:
(a) 90 g/10 min. at 200° C. and
(b) 230 g/10 min. at 225° C.

The 25% solution of product (a) in the solvent mixture described in Example 7 has a viscosity of 9,300 mPa.s at 25° C. Product (b) has a tensile strength according to DIN 53 504 of 37 MPa with an elongation at break of 410%. Shore hardness D is 53.

EXAMPLE 9

The following are fed into the hopper of the screw extruder:
(1) 200 parts of a mixture of 100 parts of the polyadipate with hydroxyl number 51 and acid number 0.7 described in Example 1, 0.5 parts of an aromatic carbodiimide (Stabaxol 1 ®, Bayer AG), 1.2 parts of ethylene-bis-stearylamide, 0.4 parts of 2,6-ditertiary-butyl-4-methylphenol and 25 parts of butanediol-(1,4),

| | | |
|---|---|---|
| (2a) | 97.2 parts | of a mixture of 65 parts of tolylene-2,4-diisocyanate and 35 parts of tolylene-2,6-diisocyanate. |
| (b) | 122 parts | |

The following are fed into the fifth housing of the screw extruder:
(3a) 5 parts of water (theoretical quantity: 0.9 parts),
(b) 6 parts of water (theoretical quantity: 3.4 parts).

A melt which is still clear when solidified leaves the screw extruder operating at a shaft speed of 300 min$^{-1}$.

Product (b) has an IMI of 30 g/10 min. at 180° C.

EXAMPLE 10

The following are fed continuously into the hopper of the screw extruder:
(1) 600 parts of a mixture of 100 parts of a polybutanediol adipate with hydroxyl number 48 and acid number 0.5, 38.3 parts of butanediol-(1,4) and 2.9 parts of n-octanol, and
(2) 578 parts of diphenylmethane-4,4'-diisocyanate.

The following are fed simultaneously into the fifth screw housing:
(3a) 5.6 parts of water (theoretical quantity: 4.9 parts) and
(b) 28 parts of water (theoretical quantity: 4.9 parts).

The reaction in the extruder takes place at a shaft speed of 300 revolutions per minute.

The melt indices of the products are found to have the following values:

| Product | Measuring Temperature | IMI |
|---|---|---|
| (a) | 210° C. | 11 g/10 min. |
| (b) | 210° C. | 66 g/10 min. |

The solution viscosity of product (b) determined on a 25% solution in dimethylformamide/methylethyl ketone (4:1) at room temperature (25° C.) is found to be 18,000 mPa.s.

EXAMPLE 11

The following are introduced into the feed hopper of the screw extruder:
(1) 230 parts of an isocyanate prepolymer with an isocyanate content of 5.9% obtained from 70 parts of polybutanediol adipate with a hydroxyl number of 51 and an acid number of 0.7, 0.8 parts of ethylene-bis-stearylamide, 0.8 parts of n-octanol and 26.4 parts of diisocyanato-diphenylmethane and maintained at 60° C., and (2) 7.4 parts of butanediol-(1,4).

(3) 50 parts of water (theoretical quantity about 1.4 parts) are fed at the same time into the fifth housing.

The reaction is carried out at a screw speed of 300 min$^{-1}$ and the same housing temperature profile as in Example 10. The product has an IMI of 7 g/10 min. at 180° C.

EXAMPLE 12

The following are introduced into the feed hopper of the screw extruder:

(1) 500 parts of an isocyanate prepolymer with an isocyanate content of 9.6% obtained from 100 parts of polybutanediol adipate with a hydroxyl number of 51 and an acid number of 0.6, 0.4 parts of 2,6-ditertiarybutyl-4-methylphenol, 1.6 parts of n-octanol and 60.0 parts of 4,4'-diisocyanato-diphenylmethane and (2) 48.8 parts of butanediol-(1,4).

The following are fed into the fifth extruder housing:

(3a) 6 parts of water, (b) 8 parts of water, (c) 4 parts of water, (d) 2 parts of water, (e) 0.5 parts of water, (=theoretical quantity).

The reaction takes place at a screw speed of 300 min$^{-1}$. The average dwell time between hopper and nozzle plate is about 1.5 minutes.

The products have the following melt and solution viscosities:

| Product | IMI at 190° C. (g/10 min.) | Solution viscosities (mPa.s) (1) |
|---|---|---|
| (a) | 44 | 485 |
| (b) | 53 | 450 |
| (c) | 51 | 410 |
| (d) | 34 | 640 |
| (e) | 5 | 2300 |

(1) 25% in dimethylformamide/methylethyl ketone (1:1), determined at 25° C.

The melt viscosities and solution viscosities show that upwards of a certain quantity of water (about 4 parts), the molecular weights of the reaction product remain virtually constant so that an excess of water compensates for any fluctuation in the quantities of other components introduced.

EXAMPLE 13

The following are introduced continuously into the hopper of the screw extruder:

(1) 420 parts of an isocyanate prepolymer with an isocyanate content of 12.9% obtained from 60 parts of a linear polypropylene glycol with a hydroxyl number of 56, 0.1 parts of 2,6-ditertiarybutyl-4-methylphenol and 52.5 parts of diisocyanato-diphenylmethane, and (2) 71.5 parts of hexanediol-(1,6) and $5 \times 10^{-3}$ parts of titanium tetrabutylate.

At the same time, (3) 2.5 parts of water (the quantity theoretically required for the found isocyanate content would be about 0.7 parts) are fed into the fifth housing.

The reaction is carried out at a shaft speed of 300 revolutions per minute.

A 25% solution of the product in dimethylformamide/methylethyl ketone (4:1) is clear and has a viscosity of 29,000 mPa.s.

EXAMPLE 14

420 parts of an isocyanate prepolymer (free isocyanate content 7.9% of 21.3 parts of diisocyanato-diphenylmethane and 48 parts of polyhexanediol adipate containing 15 ppm of titanium tetrabutylate and having a hydroxyl number of 48 and acid number of 0.7) are introduced into the feed hopper of the screw extruder. 23 parts of water (theoretically required: 7.1 parts) are at the same time fed into the fifth housing.

The product obtained at a shaft speed of 300 revolutions per minute is cloudy at room temperature and has an IMI of 7 g/10 min. at 250° C.

EXAMPLE 15

The following are introduced into the feed hopper of the screw extruder:

(1) 500 parts of an isocyanate prepolymer with an isocyanate content of 2.9% obtained from 200 parts of polybutanediol adipate with a hydroxyl number of 50, and an acid number of 0.6, 9.5 parts of butanediol-(1,4), 1.2 parts of ethylene-bis-stearylamide and 75.1 parts of diisocyanato-diphenylmethane, (2) and at the same time, 5.85 parts of Glauber salt ($Na_2SO_4 \cdot 10H_2O$).

An opaque product having an IMI of 12 g/10 min. at 200° C. is obtained at a shaft speed of 250 revolutions per minute.

EXAMPLE 16

The following are continuously fed into the hopper of the screw extruder:

(1) 324 parts of a polyol mixture activated with 30 ppm tin octoate of 75 parts of a copolyester of adipic acid, butanediol and ethylene glycol with hydroxyl number 55.8 and acid number 0.7, 25 parts of a polybutanediol adipate with a hydroxyl number of 53.2 and an acid number of 0.5, 1.2 parts of ethylene-bis-stearylamide and 0.05 parts of 2,6-ditertiary butyl-4-methylphenol, and (2) 269 parts of diisocyanato-diphenylmethane.

Into the fifth housing of the reaction extruder are introduced (3) 76.5 parts of a mixture of 45 parts of butanediol-(1,4), 1.0 part of water (molar ratio butanediol/water=9:1) and 1.2 parts of octanol.

The carbon dioxide evolved in the reaction may be discharged through a degasing housing (a) at 200 Torr, (b) against atmospheric pressure and (c) against an excess pressure of 5 bar.

A clear, bubble-free melt is discharged from the extruder operated with a shaft speed of 300 min$^{-1}$. The melt index (IMI) of the products at 210° C. has the following values:

(a) 39 g/10 min.

(b) 72 g/10 min.

(c) 89 g/10 min.

Dissolved in a mixture of dimethylformamide/methylethyl ketone (3:2), all the products give clear, stable solutions which are suitable for the production of transparent foils and have the following viscosities at a solids content of 25%:

(a) 107,500 mPa.s (25° C.)

(b) 6,300 mPa.s (25° C.)

(c) 2,450 mPa.s (25° C.).

The materials are also suitable for injection molding and give rise to substantially transparent molded products which have the following mechanical properties:

|  | (a) | (b) | (c) |
|---|---|---|---|
| Modulus 100% (DIN 53 504) | 16.5 | 16.0 | 14.4 |
| Modulus 300% (DIN 53 504) | 36.6 | 31.1 | 27.3 |
| Tensile Strength (MPa) (DIN 53 504) | 52.4 | 47.8 | 44.7 |
| Elongation at break (%) | 383 | 431 | 436 |
| Flexural stress at a given deflection (MPa) (DIN 53 452) | 5.7 | 6.3 | 6.4 |
| Notched impact strength at −20° C. (kJ/m$^2$) (DIN 53453) | 8.4 | 13.8 | 15.6 |
| Shore hardness A/D (DIN 53 505) | 97/48 | 97/47 | 97/47 |
| Impact elasticity (%) (DIN 53 512) | 30 | 31 | 32 |
| Abrasion (mm$^3$)(DIN 53 516) | 27 | 39 | 49 |
| Shrinkage (normal/tempered) (%) | 2.4/3.4 | 2.4/3.4 | 1.9/2.9 |

What is claimed is:

1. A process for the continuous preparation of polyurethane ureas by reacting, either all at one time or stepwise, a reaction mixture comprising:
   (A) one or more polyisocyanates;
   (B) one or more compounds having an average of at least 1.8 Zerewitinoff-active hydrogen atoms and a molecular weight of from 400 to 10,000;
   (C) water in a quantity of from 0.07 to 40% by weight, based on the sum of Zerewitinoff-active compounds (B), (C) and (D); optionally with
   (D) other compounds having one or more Zerewitinoff-active hydrogen atoms and having a molecular weight of from 32 to 400; and optionally
   (E) monoisocyanates;
further characterized in that the equivalent ratio of component (B) to the sum of components (C) and (D) is from 5:1 to 1:30, the molar proportion of component (C) amounts to at least 5% of the sum of (C) and (D) and the equivalent ratio of isocyanate groups to all the Zerewitinoff-active hydrogen atoms, including water, is below 1.1:1, further characterized in that said reaction is carried out in hot screw extruders, comprising:
   (a) multishaft extruders with self-cleaning screws and kneading elements;
   (b) introducing components (A), (B) and optionally (D) and (E) into said hot screw extruder;
   (c) introducing component (C) into said screw-extruder, where the temperature in those extruders is between 120° and 280° C., thereby transferring component (C) into the gaseous phase;
   (d) adjusting pressure and temperature in the reaction zone of the extruders as to keep component C into the gaseous phase;
   (e) adjusting the temperature in the extrusion zone so as to subject the extrudate to a pressure of at least 10 bar.

2. A process for the continuous preparation of polyurethane ureas by reacting, either all at one time or stepwise, a reaction mixture comprising:
   (A') an isocyanate group-containing prepolymer obtained by prereacting (1) one or more polyisocyanates and (2) one or more compounds having an average of at least 1.8 Zerewitinoff-active hydrogen atoms and a molecular weight in the range of 400 to 10,000;
   (B) water in a quantity of from 0.07 to 40% by weight, based on the sum of Zerewitinoff-active compounds (A',2),(B) and (C); optionally with
   (C) other compounds having one or more Zerewitinoff-active hydrogen atoms and having a molecular weight of from 32 to 400; and optionally
   (D) monoisocyanates;
further characterized in that the equivalent ratio of component (A') (2) to the sum of components (B) and (C) is from 5:1 to 1:30, the molar proportion of component (B) amounts to at least 5% of the sum of (B) and (C) and the equivalent ratio of isocyanate groups to all the Zerewitinoff-active hydrogen atoms, including water, is below 1.1:1, further characterized in that said reaction is carried out in hot screw extruders, comprising
   (a) multishaft extruders with self-cleaning screws and kneading elements;
   (b) introducing components (A'), (C) and optionally (D) into said hot screw extruders
   (c) introducing component (B) into said screw extruders, where the temperature in those extruders is between 120° and 280° C., thereby transferring component (B) into the gaseous phase;
   (d) adjusting pressure and temperature in the reaction zone as to keep component (B) in the gaseous phase;
   (e) adjusting the temperature in the extrusion zone so as to subject the extrudate to a pressure of at least 10 bar.

3. A process as claimed in claim 1 or 2, wherein the reaction between isocyanate groups and water takes place at a temperature in the range of 170° to 270° C.

4. A process as claimed in claim 1 or 2, wherein said screw extruder is provided with one or more gas exhaust housings.

5. A process as claimed in claim 4, wherein said one or more exhaust gas housings are under excess pressure.

6. A process as claimed in claim 1 or 2, wherein said water is introduced into said screw extruder in a position downstream of said other starting materials, viewed in the direction of transport.

7. A process as claimed in claim 1 or 2, wherein said water is used in excess of the theoretically required quantity calculated from the excess of the isocyanate groups over Zerewitinoff-active hydrogen atoms of components (B) and (D).

8. A process as claimed in claim 1 or 2, wherein said water is in the form of water of crystallization.

9. A process as claimed in claim 1 or 2, wherein said water is in an adsorptively bound form.

10. A process as claimed in claim 1 or 2, wherein said polyurethane urea is prepared in the presence of one or more other thermoplasts.

* * * * *